(12) United States Patent
Maharaj

(10) Patent No.: US 7,344,176 B2
(45) Date of Patent: Mar. 18, 2008

(54) SUN VISOR FOR VEHICLES

(76) Inventor: Rakesh Maharaj, 14 Chearsley Road, Westville, 3629, Kwa Zulu Natal (ZA)

( * ) Notice: Subject to any disclaimer, the term of this patent is extended or adjusted under 35 U.S.C. 154(b) by 21 days.

(21) Appl. No.: 10/536,690

(22) PCT Filed: Nov. 11, 2003

(86) PCT No.: PCT/ZA03/00176

§ 371 (c)(1),
(2), (4) Date: Nov. 28, 2005

(87) PCT Pub. No.: WO2004/050405

PCT Pub. Date: Jun. 17, 2004

(65) Prior Publication Data

US 2006/0125277 A1    Jun. 15, 2006

(30) Foreign Application Priority Data

Dec. 1, 2002    (ZA) .................................. 2002/8877

(51) Int. Cl.
*B60J 3/02*    (2006.01)

(52) U.S. Cl. ................................... 296/97.6; 296/97.11

(58) Field of Classification Search ............... 296/97.6, 296/97.11
See application file for complete search history.

(56) References Cited

U.S. PATENT DOCUMENTS

| | | | |
|---|---|---|---|
| 2,596,873 A | 5/1952 | Solmes | |
| 2,894,576 A * | 7/1959 | Williams | 160/220 |
| 4,090,732 A | 5/1978 | Vistitsky | |
| 4,486,819 A | 12/1984 | Marcus et al. | |
| 4,783,111 A | 11/1988 | Spykerman et al. | |
| 4,792,176 A * | 12/1988 | Karford | 296/97.8 |
| 5,641,191 A * | 6/1997 | Jia | 296/97.6 |
| 5,662,371 A * | 9/1997 | Gera et al. | 296/97.8 |
| 6,059,347 A * | 5/2000 | Davalos | 296/97.6 |
| 6,176,539 B1 * | 1/2001 | Westerman | 296/97.6 |
| 6,412,850 B1 * | 7/2002 | Francis et al. | 296/97.6 |
| 6,616,209 B1 * | 9/2003 | Muyo | 296/97.6 |

* cited by examiner

*Primary Examiner*—Dennis H Pedder
(74) *Attorney, Agent, or Firm*—Young & Thompson

(57) ABSTRACT

A sun visor for a vehicle has a base mounted on a conventional visor, the base having a screen which is slidable or hinged for it to be moved to a position below the base and/or to one side to increase the degree of shielding from the sun.

1 Claim, 7 Drawing Sheets

SUN VISOR FOR VEHICLES

TECHNICAL FIELD OF THE INVENTION

This invention relates to a sun visor for a vehicle.

BACKGROUND ART

The conventional sun visor for a vehicle can be moved from its position against the windscreen to a position roughly at right angles thereto against the side window. In this position there is generally always a gap between the edge of the visor and the door frame which means that the sun can enter to the discomfort of the user.

There is often a gap between the driver's and the passenger's visor and the sun may enter this gap with discomfort to one or both persons. Another problem arises with short drivers who receive the full force of the sun under the conventional visor.

It is an object of the present invention to provide a visor assembly which obviates or at least greatly overcomes these problems.

DISCLOSURE OF THE INVENTION

According to the invention a sun visor for a vehicle includes a first unit which is supported on a bracket and a second unit which is associated with the first unit and is movable in relation thereto to form an extension below and/or to one side thereof.

In a preferred form of the invention the bracket is swivelable between the windscreen and side window positions In one form of the invention the second unit hooks on to the first and is slidable away therefrom to a chosen distance to fill the gap between the end of the first unit and the center of the windscreen when the unit is adjacent the windscreen; or to the gap between the end of the first unit and the door frame when the unit is adjacent the window; or even beyond, if found necessary.

In an alternative form of the invention a third unit is slidable on the second unit. Other arrangements are possible without departing from the general spirit of the invention.

BRIEF DESCRIPTION OF THE DRAWINGS

Embodiments of the invention are described below with reference to the accompanying drawings, in which.

BEST MODE FOR CARRYING OUT THE INVENTION

Figure 1:
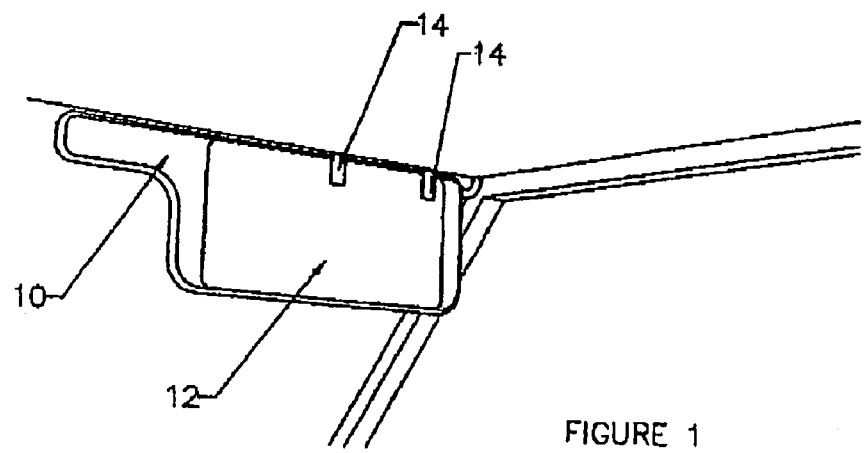
FIGS. 1 to 5 are diagrammatic representations of the various positions and arrangements of the visor of the invention.

In FIG. 1 a first unit 10 of conventional arrangement is provided. A second unit 12 has hooks 14 so that it can be retained on the first unit. When required, it can be slid from this position to a second and extended position to provide additional protection against the sun.

Figure 2:
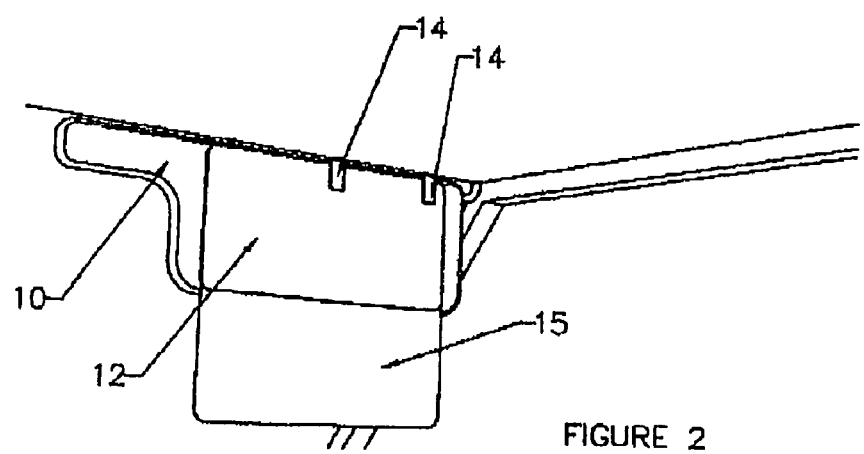
Figure 3:
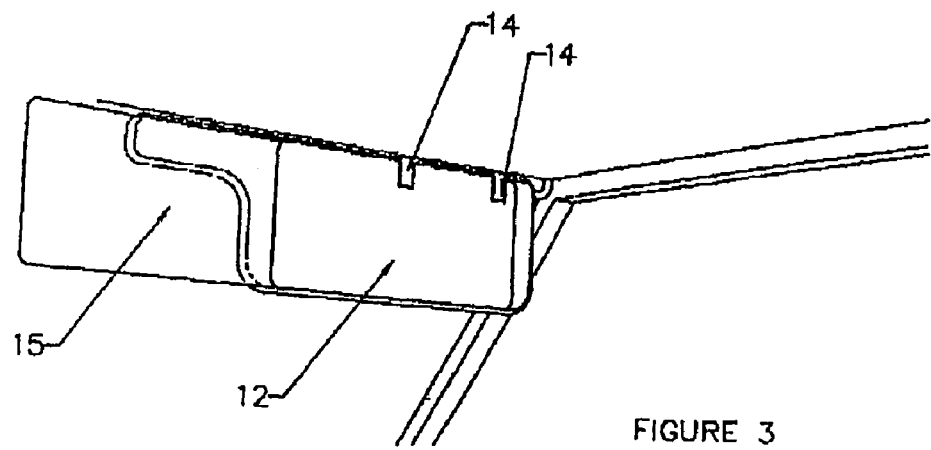

In FIG. 2 the second unit has a slidable unit 15 which may be slid to the position shown in order to shield a driver (and particularly a short driver) from the sun at a low angle, whereas in FIG. 3 the third unit 15 is slided to a position as shown to shield the driver from the gap between the end of the visor and the center of the windscreen.

Figure 4:
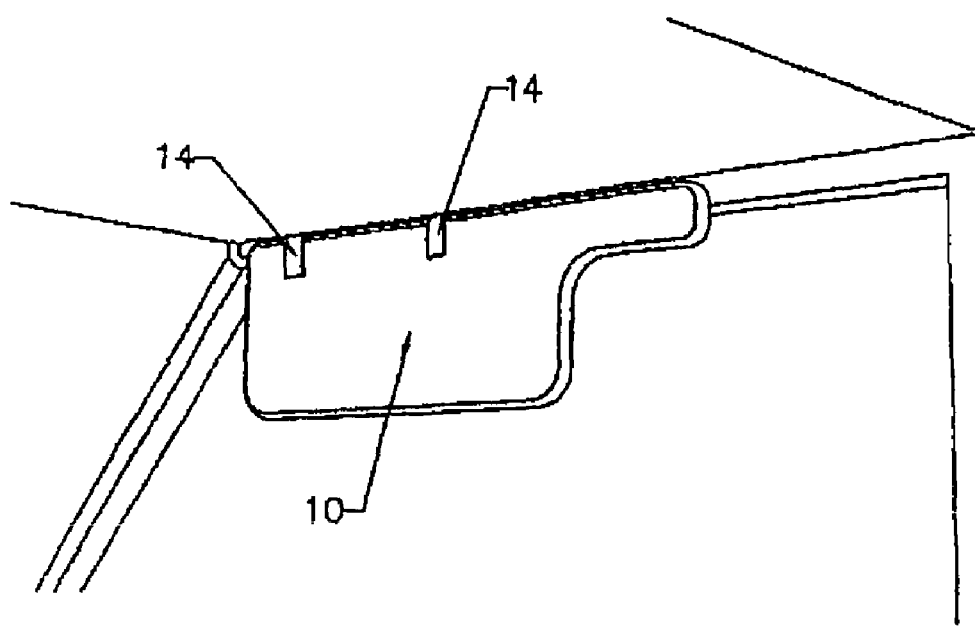
Figure 5:
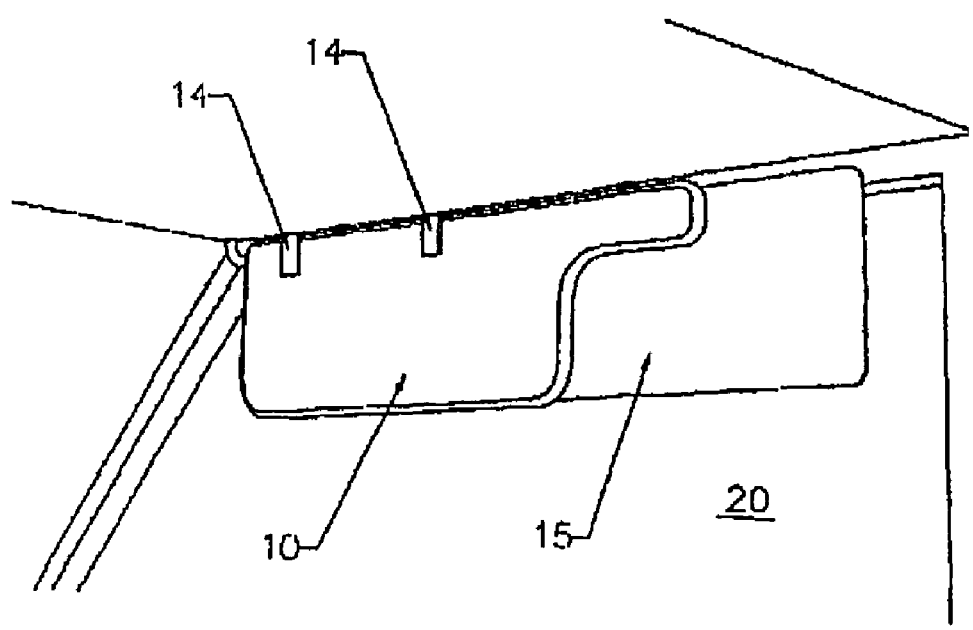

In FIG. 4 the visor is turned to be against the side window 20. The third unit 14 can then be slided towards the rear of the window to increase the shielding action from the sun on that side of the vehicle. It will be appreciated that the third unit may alternatively be slided to a position corresponding with that of FIG. 2.

Figure 6:
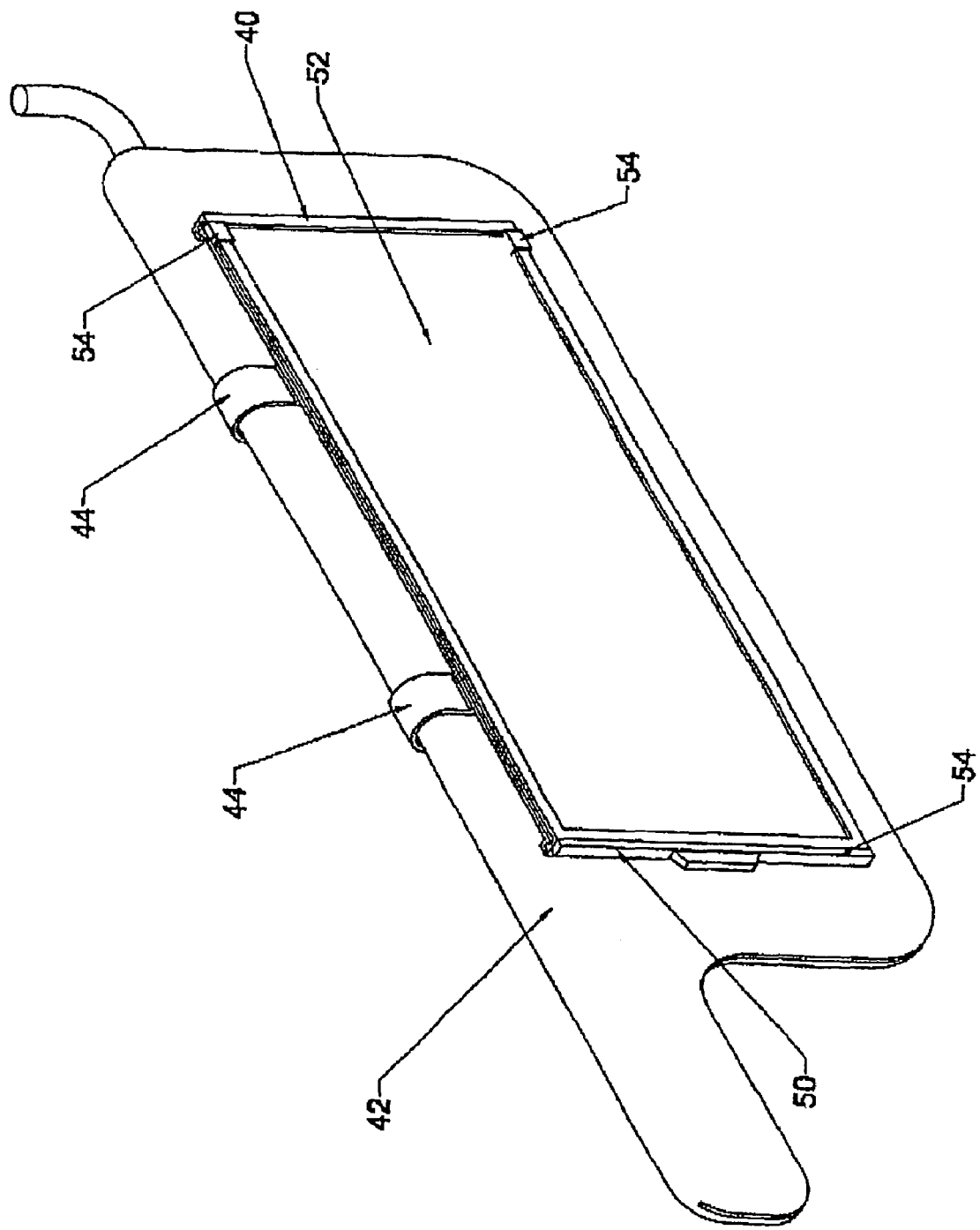
FIG. 6 is an isometric view of a visor according to the invention in its completely closed position.

Turning now to FIG. 6, a visor comprises a base 40 which is attached to an existing visor 42 by means of hooks 44. The hooks may be located in any of a number of slots 46 in the base to suit the desired arrangement.

The base has an aperture 48 which corresponds to the vanity mirror of the conventional visor.

Figure 7:
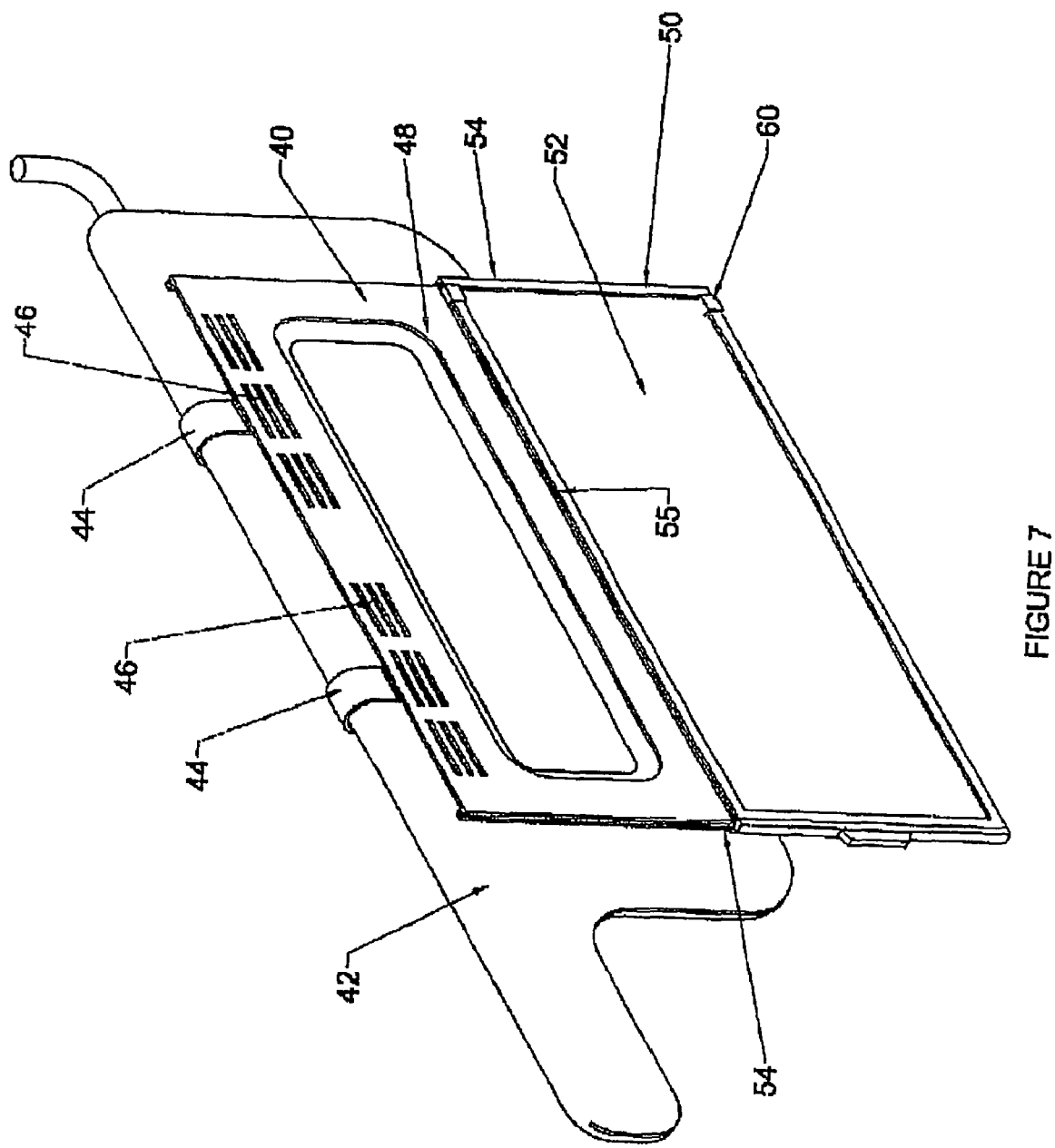
FIG. 7 shows a first open position of a visor.
Figure 8:
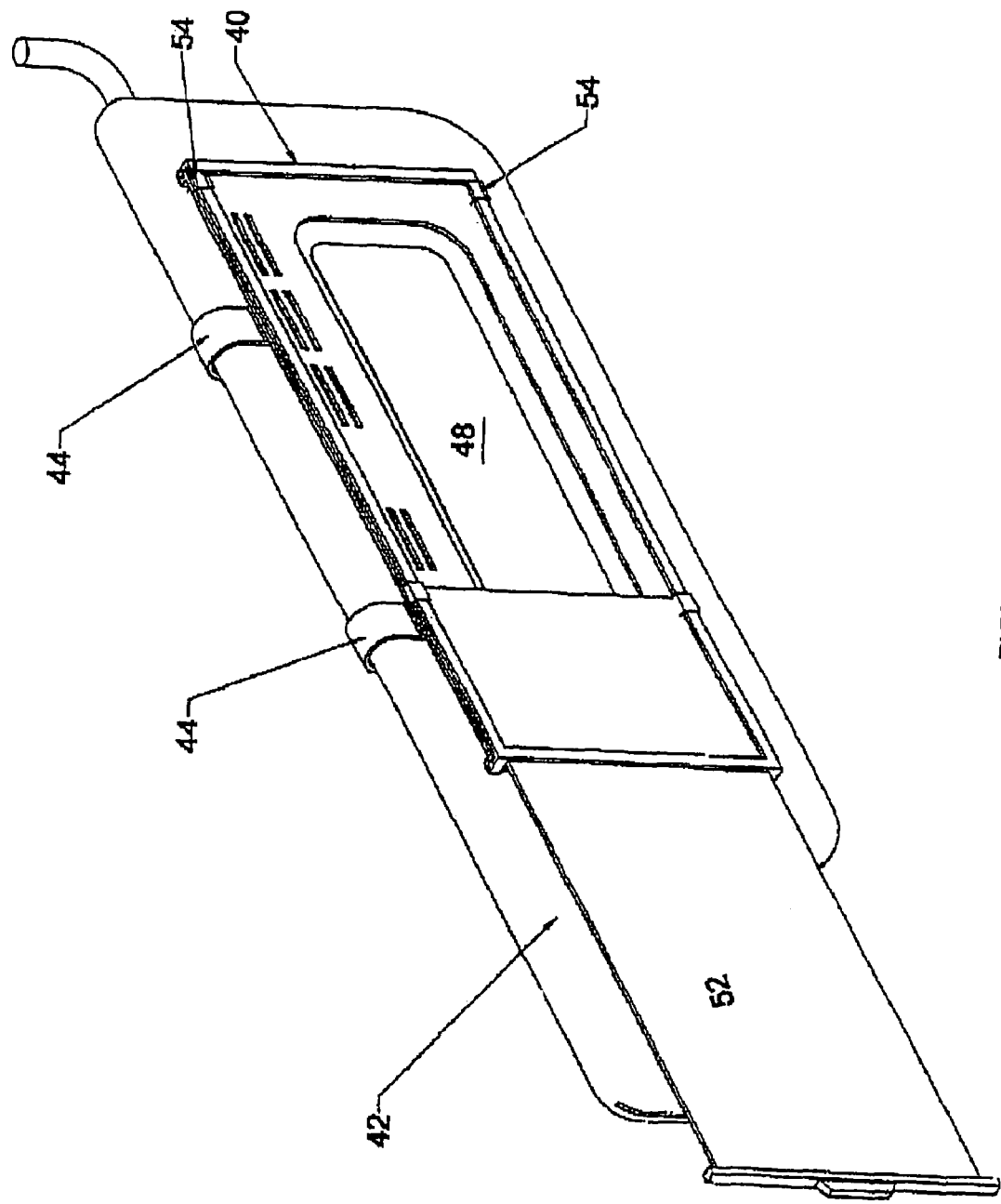
FIG. 8 shows a second open position of the visor in an intermediate state (i.e. not fully in the second position)

A frame 50 carrying a screen 52 is mountable on the base by means of channeled slides 54 so that it is slidable downwardly (FIG. 7) to increase the vertical dimension of the visor. The screen is slidable to one side (FIG. 8) to provide additional shade at the central zone of the windscreen. Shade at the side window may also be achieved by providing that the screen is hinged at.

Figure 9:
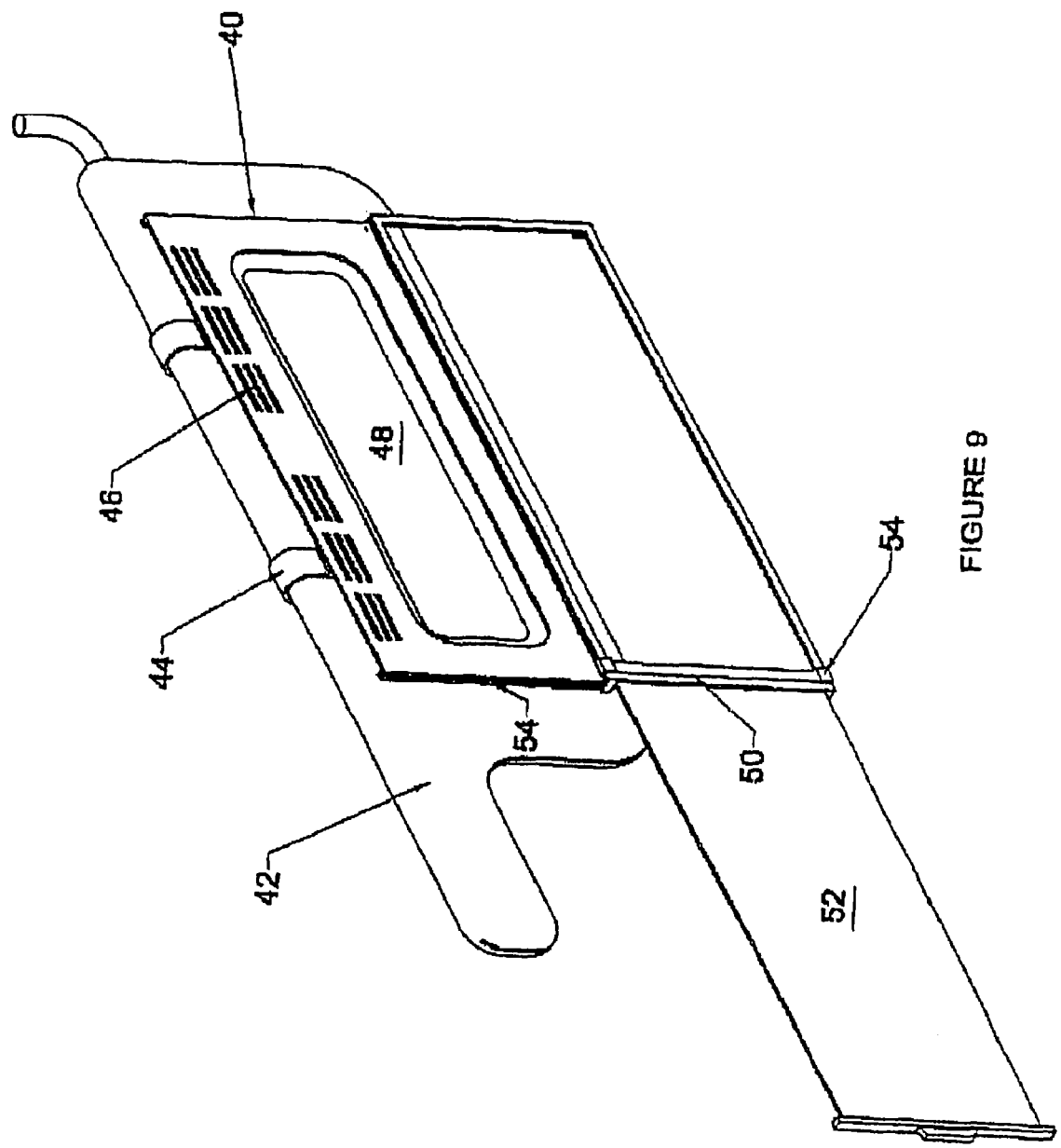
FIG. 9 is an isometric view of another possible position of the visor.
Figure 10:
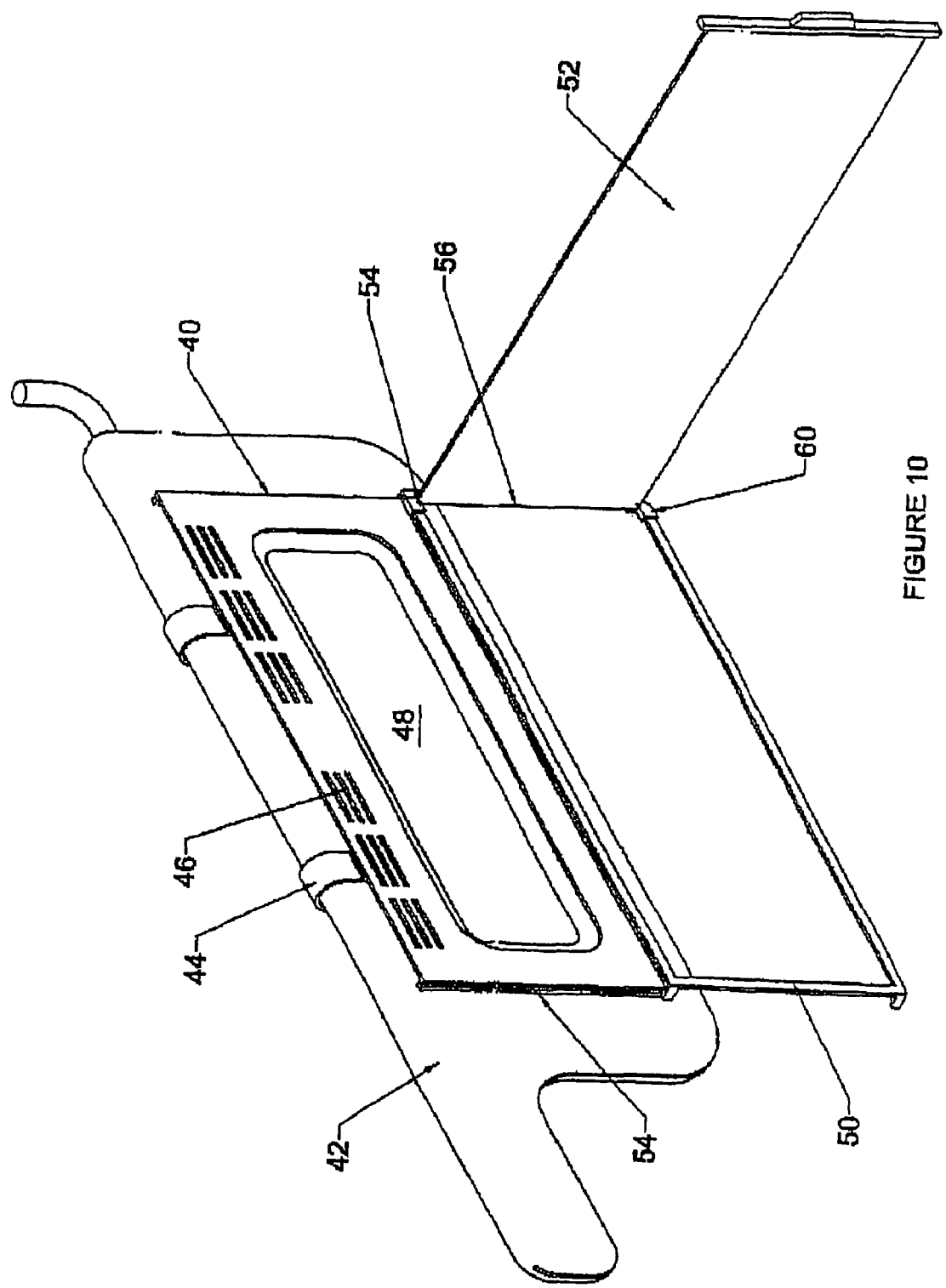
FIG. 10 is a similar view of a yet further possible extended position of the visor.

The versatility of the visor of the invention is illustrated in FIGS. 9 and 10. In the former the frame 50 is dropped as in FIG. 7 and the screen 52 is slided to a central position; while in the latter FIG. 10, the screen 52 is swung to a position adjacent the side window while the frame 50 remains in its FIG. 7 position.

The hinging of the screen also allows an additional position in which the conventional visor and base remain to protect against the direct ingress of sun rays from the front and against rays entering the side window by means of the screen being angled suitably.

The screen may be made from a tinted transparent medium to shield the driver or passenger from harmful or discomforting rays of the sun.

Tension spring loops 60 are provided at the hinges 56 so that the screen is maintained in its desired angular position.

It will be appreciated that a minimum of parts are provided so that the unit is inexpensive having regard to its versatility.

The invention claimed is:

1. A sun visor (42) adapted to occupy a vertical position in a vehicle, a base (40) secured to said visor, a frame (50) mounted for vertical sliding movement on and relative to said base when said visor is vertical, and a screen (52) having a vertical edge mounted on a vertical edge of said frame for horizontal swinging movement of said screen relative to said frame when said visor is vertical.

* * * * *